(12) United States Patent
Patel et al.

(10) Patent No.: US 6,638,993 B2
(45) Date of Patent: *Oct. 28, 2003

(54) COLORED ANTIMICROBIAL VULCANIZED RUBBER ARTICLES

(75) Inventors: Bhawan Patel, Bolton (GB); David L. Morris, Salford (GB); Geoffrey Haas, Spartanburg, SC (US); William O. Burke, III, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/015,878

(22) Filed: Dec. 12, 2001

(65) Prior Publication Data

US 2003/0119937 A1 Jun. 26, 2003

(51) Int. Cl.$^7$ .............................. C08K 5/09; C08K 3/10; C08K 3/34
(52) U.S. Cl. ................... 523/122; 524/287; 524/403; 524/492
(58) Field of Search ................... 523/122, 86; 524/287, 524/403, 492, 297, 398, 450

(56) References Cited

U.S. PATENT DOCUMENTS

| | | | | |
|---|---|---|---|---|
| 5,085,416 A | * | 2/1992 | Miyake et al. | 269/289 R |
| 5,441,717 A | | 8/1995 | Ohsumi et al. | 423/306 |
| 5,466,726 A | | 11/1995 | Inoue et al. | 523/122 |
| 5,698,229 A | | 12/1997 | Oshumi et al. | 424/604 |
| 5,736,591 A | | 4/1998 | Dunn | 523/122 |
| 5,926,238 A | | 7/1999 | Inoue et al. | 349/61 |
| 6,342,212 B1 | * | 1/2002 | Schuette et al. | 424/78.1 |
| 6,448,306 B1 | * | 9/2002 | Lever et al. | 523/122 |
| 6,455,610 B1 | * | 9/2002 | Lever et al. | 523/122 |

FOREIGN PATENT DOCUMENTS

| | | | |
|---|---|---|---|
| EP | 000190504 | * | 8/1986 |
| EP | 000400349 | * | 12/1990 |
| EP | 000516184 A1 | * | 12/1992 |
| GB | 002335566 A1 | * | 9/1999 |
| JP | 7065149 | | 3/1995 |
| JP | 9026273 | | 1/1997 |
| JP | 9140034 | | 5/1997 |

* cited by examiner

Primary Examiner—Margaret Medley
(74) Attorney, Agent, or Firm—Terry T. Moyer; William S. Parks

(57) ABSTRACT

Certain non-silicone vulcanized rubber articles made from at least a majority by weight of ethylene-propylene-diene modified (terpolymer) rubber (such as, without limitation, EPDM and/or NBR) that include silver-based compounds to provide highly desirable long-term antimicrobial characteristics within the cured rubber articles, at least a portion of which exhibits a color other than black, are provided. Such articles are in either solid or blown (foam or sponge) state (or combinations of both in multilayered forms, either all colored or individual layers colored) that can be utilized in a variety of different applications. As silver-based compounds are deleteriously affected by utilization of standard curing agents and curing accelerators, such as sulfur-based compounds and/or systems, the ability to provide such an effective antimicrobial vulcanized rubber article is rather difficult. However, this invention encompasses the presence of different non-sulfur-based curing systems and agents, such as peroxides, as one example, that permit vulcanization and do not irreversibly bind silver ions thereto, thereby resulting in long-term antimicrobial performance of the ultimate rubber article itself. The rubber articles must also comprise fillers and may also include plasticizers to provide desired characteristics of dimensional stability, stiffness, flexural modulus, tensile strength, abrasion resistance, elongation, and the like, for the ultimate rubber article, while simultaneously and surprisingly both enhancing the control of antimicrobial efficacy of the rubber article and not deleteriously binding to the available silver to permit coloring of the target rubber as well.

14 Claims, No Drawings

# COLORED ANTIMICROBIAL VULCANIZED RUBBER ARTICLES

FIELD OF THE INVENTION

This invention relates to certain non-silicone vulcanized rubber articles made from at least a majority by weight of rubber (such as, without limitation, ethylene-propylene diene modified rubber, a.k.a., EPDM, and/or acrylonitrile butadiene rubber, aka, NBR) that include silver-based compounds to provide highly desirable long-term antimicrobial characteristics within the cured rubber articles, at least a portion of which exhibits a color other than black. Such articles are in either solid or blown (foam or sponge) state (or combinations of both in multilayered forms, either all colored or individual layers colored) that can be utilized in a variety of different applications. As silver-based compounds are deleteriously affected by utilization of standard curing agents and curing accelerators, such as sulfur-based compounds and/or systems, the ability to provide such an effective antimicrobial vulcanized rubber article is rather difficult. However, this invention encompasses the presence of different non-sulfur-based curing systems and agents, such as peroxides, as one example, that permit vulcanization and do not irreversibly bind silver ions thereto, thereby resulting in long-term antimicrobial performance of the ultimate rubber article itself. The rubber articles must also comprise fillers and may also include plasticizers to provide desired characteristics of dimensional stability, stiffness, flexural modulus, tensile strength, abrasion resistance, elongation, and the like, for the ultimate rubber article, while simultaneously and surprisingly both enhancing the control of antimicrobial efficacy of the rubber article and not deleteriously binding to the available silver to permit coloring of the target rubber as well.

DISCUSSION OF THE PRIOR ART

All U.S. Patents listed below are herein entirely incorporated by reference.

There has been a great deal of attention in recent years given to the hazards of bacterial contamination from potential everyday exposure. Noteworthy examples of such concerns include the fatal consequences of food poisoning due to certain strains of *Eschericia coli* being found within undercooked beef in fast food restaurants; *Salmonella enteritidis* contamination causing sicknesses from undercooked and unwashed poultry food products; and illnesses and skin infections attributed to *Staphylococcus aureus, Klebsiella pneumoniae*, yeast (*Candida albicans*), and other unicellular organisms. With such an increased consumer interest in this area, manufacturers have begun introducing antimicrobial agents within various everyday products and articles. For instance, certain brands of cutting boards, shoe soles, shoe inserts, medical devices and implements, liquid soaps, etc., all contain antimicrobial compounds. The most popular antimicrobial for such articles is triclosan. Although the incorporation of such a compound within liquid or certain polymeric media has been relatively simple, other substrates, specifically vulcanized rubber and surfaces thereof, have proven less accessible. Furthermore, such triclosan additives have proven to be difficult in use or ineffective for certain bacteria. For instance, triclosan itself migrates easily within and out of certain polymeric substrates and/or matrices (and thus is not very durable), lacks thermal stability (and thus readily leaches out of rubber and like materials at higher temperatures), and does not provide a wide range of bacterial kill (for instance does not exhibit any kill for *Pseudomonas aeruginosa*).

Antimicrobial rubber formulations are certainly highly desired for the production of vulcanized rubber articles and compositions to provide not only antibacterial benefits, but also antifungal, antimildew, antistaining, and odor control properties. Rubber articles are utilized in many different applications, from automobiles (hoses, tires, bumpers, etc.), to household items (toys, sink washers, gaskets, appliances, floor mats, door mats, seals, carpeted rubber mats, gloves, and the like), and other areas in which bacterial growth is a potential problem. There thus remains a long-felt need to provide an effective, durable, reliable antimicrobial vulcanized rubber formulation which will provide such long-term antimicrobial, etc., effects within the final vulcanized article. Unfortunately, such a highly desired antimicrobial rubber formulation and/or vulcanized article containing silver-based antimicrobial agents has heretofore not been provided by the pertinent prior art.

The closest art includes Japanese Patent Application 1997-342076 which discloses the production of unvulcanized rubber formulations and articles exhibiting antibacterial properties due to the presence of silver complexes. Such formulations are formed through high temperature kneading in an oxygen-free atmosphere and are used as parts in a water disinfection system. Again, no vulcanized rubber is taught or obtained within or through this disclosure. Antimicrobial rubber bands have been taught in Japanese Patent Application 1997-140034 in vulcanized form with silver antimicrobials therein. However, such compounds are rather limited in use and the vulcanization step must include a sulfur curing agent to effectuate the final vulcanized arrangement of the subject rubber. Such sulfur curing agents have a remarkably deleterious effect on certain silver-based antimicrobials such that the sulfur reacts with the silver ion to from silver sulfide, thereby rendering it ineffective as a bactericide. As such, the utilization of such specific rubber band formulations for and within large-scale antimicrobial articles is basically unworkable.

Certain types of antimicrobial peroxide-catalyst vulcanized rubber formulations have been produced in the past; however, such peroxide-cured rubbers are all silicone-based. It is well understood and accepted that silicone rubbers cannot be vulcanized by typical sulfur-based catalysts. Thus, the antimicrobial rubber formulations of Japanese Patent Applications 1997-026273 and 1995-065149 as well as U.S. Pat. No. 5,466,726 are standard vulcanized silicone rubber formulations and articles which also include certain antimicrobial compounds.

Furthermore, rubber latexes (non-vulcanized) comprising antimicrobials have been disclosed (U.S. Pat. No. 5,736,591, for example), as have floor mats having silver-based antimicrobials incorporated within pile fiber components and which have non-antimicrobial rubber backings cured through peroxide-catalyzed vulcanization to protect the pile fiber antimicrobial compounds from attack by any sulfur compounds (as in Japanese Patent Applications 1993-3555168 and 1995-38991). Again, however, to date there have been no disclosures or suggestions of producing a vulcanized non-silicone rubber formulation exhibiting excellent antimicrobial properties through the long-term effective utilization of silver-based antibacterial compounds. This invention fills such a void.

OBJECT OF THE INVENTION

It is therefore an object of this invention to provide a colored (other than black) antimicrobial vulcanized rubber-containing article exhibiting sufficient antimicrobial activity and structural integrity to withstand repeated use without losing an appreciable level of either antimicrobial power or modulus strength. Another object of the invention is to provide an antimicrobial colored vulcanized rubber article comprising silver-based antimicrobial compounds which include curing agents which do not deleteriously effect the antimicrobial activity of the finished vulcanized article (and thus is essentially free from sulfur-based curing agents and accelerators). Yet another object of this invention is to provide a colored vulcanized EPDM and/or NBR rubber-containing article that exhibits log kill rates for *Staphylococcus aureus* and *Klebsiella pneumoniae* (and/or other types of bacteria as well) of at least 1.0 after 24 hours exposure at room temperature as well as prevention of growth of certain fungi after at least 15 days of exposure. Still another object of this invention is to provide a vulcanized EPDM and/or NBR rubber-containing article comprising structural integrity filler components and plasticizers (such as properly formulated silica, certain metal salts, certain organic salts, calcium carbonate, certain metal oxides, clays, certain oils, and the like) that also provide enhancements in the control of antimicrobial efficacy of the article itself through regulated silver ion release to the article surface (e.g., exhibits higher log kill rates for *Staphylococcus aureus* and *Klebsiella pneumoniae* and prevention of growth of fungi such as *Aspergillus niger*). Still another object of the invention is to provide a finished colored rubber article that exhibits increases in antimicrobial activity after industrial washing and/or abrasion. Yet another object is to provide a simple method of producing such an antimicrobial colored vulcanized EPDM and/or NBR rubber-containing article.

Accordingly, this invention encompasses a dimensionally stable vulcanized rubber-containing colored article exhibiting log kill rates for *Staphylococcus aureus* and *Klebsiella pneumoniae* of at least 1.0 each after 24 hours exposure at room temperature. Also, this invention encompasses a dimensionally stable vulcanized rubber-containing article exhibiting antifungal properties such that said article exhibits at least 70% inhibition in accordance with Test Method ISO 486, of *Aspergillus niger* ATCC 6275 for at least 15 days at 30° C. and at greater than 90% humidity. Furthermore this invention encompasses such a colored vulcanized rubber-containing article comprising at least one non-discoloring silver ion control release additive, such as those selected selected from the group consisting of fillers (such as calcium carbonate, china or calcined clay, silane-coated or mixed silica, bivalent metal silicates, aluminum trihydrate, and any mixtures thereof), at least one coloring agent to provide a color to the article other than black, and, optionally, at least one plasticizer (e.g., oils such as phthalate oils and paraffinic oils). Additionally, this invention encompasses a method of producing such a colored vulcanized EPDM and/or NBR rubber-containing article comprising the steps of providing a rubber formulation comprising uncured rubber, at least one non-sulfur based curing agent, and at least one silver-based antimicrobial compound, at least one non-discoloring silver release additive (filler), at least one coloring agent to provide a non-black color to the finished article, and vulcanizing said rubber formulation at a temperature of at least 150° C. and at least at a pressure of 3 bars, wherein said rubber formulation is substantially free from sulfur curing agent and accelerator.

The term "dimensionally stable" is intended to encompass a vulcanized rubber article that is structurally able to be handled without disintegrating into smaller portions. Thus, the article must exhibit some degree of structural integrity and, being a rubber, a certain degree of flexural modulus.

The term "colored" is intended, as implied above, to denote a color other than black for the finished black article. Such an effect provides aesthetic improvements, as well as potential product identification benefits, to the target rubber article. Without intending on being limited to any specific scientific theory, the presence of certain fillers within the rubber formulation appears to result in problematic complexing with the silver ions in the antimicrobial agent. Such a reaction binds the silver and creates dark discolorations within the rubber itself. With a black pigment (or other colorant) present, the rubber is not deleteriously discolored with such a resultant reaction between the silver ion and the filler (such as, silica, aluminum silicate, and others) since the color of the base rubber does not dominate the desired black coloration. However, with lighter colors, such as white, red, blue, yellow, green, orange, and the like, the presence of these fillers tends to create an undesirable dominant discoloration within the target formulation such that the article would appear black or like dark-colored; certainly not the same as desired in terms of the target lighter colorations. Thus, there are important criteria to be met in order to provide the desired colored rubber articles of this invention, primarily in terms of selection of filler component to not only provide dimensional stability and substance therein, but also to permit proper coloring of the target rubber article, again, for predominately aesthetic purposes. To date, again, the ability to provide a colored antimicrobial rubber with antimicrobial durability and aesthetically pleasing appearance (in terms of color), has been extremely limited due to the proper selection requirements of an antimicrobial agent, a curing system, and a filler component, in tandem that will not deleteriously affect the final target rubber article.

Thus, such a specific antimicrobial vulcanized rubber-containing article has not been taught nor fairly suggested within the rubber industry or prior art. As noted above, the avoidance of sulfur-based curing agents and accelerators to any appreciable degree thus permits the retention of silver antimicrobials within the final product in amounts sufficient to provide long-lasting log kill rates for *Staphylococcus aureus, Klebsiella pneumoniae, Pseudomonas aeruginosa*, and *Escheria coli*, at the very least. Furthermore, due primarily to high costs, non-sulfur curing agents have not been prevalent within vulcanized rubber formulations and articles. As such, there has been no teaching or fair suggestion of coupling non-sulfur curing agents (and most preferably peroxide curing agents) with silver-based antimicrobial agents within pre-vulcanized rubber formulations to form effectively antimicrobial vulcanized rubber articles.

Additionally, generally and preferably, certain fillers and, supplementally, oils, (such as bivalent silicates, silane-coated or mixed silica, zinc oxide, clays, aluminum trihydrate salts, calcium carbonate, and other types that do not discolor silver antimicrobial-containing EPDM and/or NBR, as merely preferred examples, rubber formulations) are required to provide both flexural modulus and structural integrity to vulcanized rubber articles. The rubber component alone generally does not exhibit proper dimensional stability without such additives. Surprisingly, the presence of such additives also provides the ability to control silver-ion release at the target article surface as well as lack of deleterious reaction with the desired silver ions within the antimicrobial component present therein. As such, not only does the target article exhibit acceptable, if not excellent, dimensional stability subsequent to vulcanization, but also the ability to be colored in bright, pleasing shades without unwanted complications (and thus darkening) through the aforementioned problematic potential silver ion-filler reaction. Such an inventive colored durable antimicrobial rubber is thus unique and requires selectivity in terms of components therein to achieve. Such beneficial fillers, as noted above, thus appear to provide a number of important characteristics to, for, and within the target rubber formulation. Without intending to be bound to any specific scientific theory, it appears that some such fillers, as noted above, and particularly those that are hydrophilic in nature (bivalent silicates, silane-coated silica, zinc oxide, and the like), act in such a way as to draw moisture into the article which then transports silver ions from within the article to the surface. In such a situation, then, the rubber article may exhibit enhanced silver release resulting in higher log kill rates for certain bacteria due to the presence of larger amounts of available surface silver ions. Other hydrophobic fillers, such as some pigments, clays, and calcium carbonate (as some examples) appear to work in the opposite manner by keeping water out of the target article and thus prevent silver-ion migration to the article surface. Thus, the reduction of such silver-ion availability decreases the antibacterial efficacy of the rubber article. In effect, then, the actual antibacterial efficacy of the entire rubber article can be controlled through the presence of certain amounts of such generally required fillers and oils (some hydrophilic antistatic agents also appear to act in the same manner as silica as well). As a result, the necessary filler and/or oil constituents required to provide dimensional resiliency and/or flexural modulus (and thus actual usefulness) of the finished article serve a dual purpose heretofore unrecognized within the rubber industry. Rubber articles can be produced with specific end-uses in mind depending upon the duration of antimicrobial activity desired through the addition of specific amounts of such additives. Again, such a targeted duration antimicrobial vulcanized article and the benefits thereof have heretofore been unknown and unrecognized within the rubber industry. These rubber components are thus hereinafter referred to as "silver ion release control additives".

The term EPDM rubber, as noted above, is intended to cover any standard rubber which possesses at least a majority by weight of EPDM rubber and which must be vulcanized to provide a dimensionally stable rubber article. It is intended that such vulcanization or other processing be performed in an environment that is inexpensive to provide and thus should be undertaken in an oxygen-rich atmosphere (as opposed to an anaerobic environment which is generally difficult to provide). EPDM rubber has been utilized previously within the rubber industry for a variety of applications and is generally well known and taught throughout the prior art. Such inventive rubber articles should also possess a chemical plasticizer which aids in the breakdown period of the elastomer during compounding and processing (and provides flexural modulus properties to the finished article) as well as fillers required for reinforcement (e.g. calcium carbonate, carbon black, silica, and clays). Optionally, to form a blown (foam or sponge) rubber type, a blowing agent may be added to the inventive formulation.

The non-silicone rubber component or components of the inventive rubber article is therefore a majority of EPDM and other types of possible rubber (in order to provide different strengths, flexibilities, or other properties) such as those, without limitation, selected from the group consisting of nitrile rubber [such as acrylonitrile-butadiene (NBR)], styrene-butadiene rubber (SBR), natural rubber, chloroprene, ethylene propylene rubber, natural rubber, polyurethane rubber, butyl rubbers, isoprene, halobutyl rubbers, fluoroelastomers, epichlorohydrin rubber, polyacrylate rubber, and chlorinated polyethylene rubber, hydrogenated SBR, hydrogenated NBR, and carboxylated NBR. Although the presence of silicone-rubber is discouraged within the inventive formulation, there remains the possibility of adding certain low amounts of such specific unvulcanized rubber components without adversely affecting the overall antimicrobial rubber formulation itself. Thus, up to 25% by total weight of the formulation may be silicone-rubber; however, the vast majority of the rubber formulation must be non-silicone rubber. Furthermore, the non-silicone rubber portion must not possess an appreciable amount of sulfur-based curing agent or residue (in the finished article) and thus must be vulcanized through curing with primarily non-sulfur-based compounds (such as peroxides and metal oxides, for example). The rubber component is present in amount of from about 10 to about 1,000 parts of the entire composition, more preferably from about 50 to about 500 parts, and most preferably from about 100 to about 200 parts. Thus, with a total number of parts between about 300 and 2,000 parts throughout the target vulcanized rubber article, the rubber constitutes from about 25 to about 70% of the percentage by parts of the entire article. The remainder comprises additives such as fillers, oils, curing agents, the desired antimicrobial agents, optional blowing agents, and the like (as discussed more thoroughly below).

Furthermore, the non-silicone rubber portion must not possess an appreciable amount of sulfur-based curing agent or residue (in the finished article) and thus must be vulcanized through curing with primarily non-sulfur-based compounds (such as peroxides and metal oxides, for example). The rubber component is present in amount of from about 10 to about 1,000 parts of the entire composition, more preferably from about 50 to about 500 parts, and most preferably from about 100 to about 200 parts.

The antimicrobial agent of the inventive raw rubber formulation may be of any standard silver-based compounds. Such compounds, in contrast with organic types, such as triclosan, for example, do not exhibit low thermal stability and thus remain within the target matrix or substrate at different temperatures. Thus, such an antimicrobial is more easily controlled, as discussed above, for surface release as desired. Such agents include, without limitation, silver salts, silver oxides, elemental silver, and, most preferably ion exchange, glass, and/or zeolite compounds. Of even greater preference are silver-based ion exchange compounds for this purpose due to the low levels of discoloration and enhanced durability in the final product provided by such compounds, the efficacy provided to the final formulation with such a compound, and the ease of manufacture permitted with such specific compounds. Thus, the antimicrobial agent of this invention may be any type which imparts the desired log kill rates as previously discussed to *Staphylococcus aureus, Klebsiella pneumoniae, Escherichia coli*, and *Pseudomonas aeruginosa*, as merely representative organisms. Furthermore, such antimicrobial compounds must be able to withstand elevated processing temperatures for successful incorporation within the target non-sulfur (peroxide, for example) cured EPDM rubber-containing articles. Again, such antimicrobial agents comprise, preferably, silver-containing ion exchange, glass, and/or zeolite compounds. Most preferably, such a compound is a silver-based ion-exchange compound and particularly does not include any added organic bactericide compounds (thereby not permitting a release of volatile organic compounds into the atmosphere during processing at high temperatures, etc.). The preferred silver-based ion exchange material is an antimicrobial silver zirconium phosphate available from Milliken & Company, under the trade name ALPHASAN®. Such compounds are available in different silver ion concentrations as well as mixtures with zinc oxide. Thus, different compounds of from about 0.01 to 10% of silver ion concentration, preferably from about 3 to about 8%, and most preferably amounts of about 3, 3.8, and 10% by total amount of components (e.g. of the total amount of silver ions and zirconium phosphate) are possible. Other potentially preferred silver-containing solid inorganic antimicrobials in this invention are silver-substituted zeolite available from Sinanen under the tradename ZEOMIC®, or a silver-substituted glass available from Ishizuka Glass under the tradename IONPURE®, which may be utilized either in addition to or as a substitute for the preferred species. Other possible compounds, again without limitation, are silver-based materials such as MICROFREE®, available from DuPont, as well as JMAC®, available from Johnson Mathey.

Generally, such an antimicrobial compound is added to a rubber formulation in an amount of from about 0.1 to 10% by total weight of the particular total rubber formulation; preferably from about 0.1 to about 5%; more preferably from about 0.1 to about 2%; and most preferably from about 0.2 to about 2.0%.

Furthermore, with regard to silver-based inorganic antimicrobial materials, these particular antimicrobial rubber articles are shown to be particularly suitable for the desired high levels of efficacy and durability required of such articles. It has been found that certain silver-based ion exchange compounds, such as ALPHASAN® brand antimicrobials available from Milliken & Company, (U.S. Pat. Nos. 5,926,238, 5,441,717, 5,698,229 to Toagosei Chemical Industry Inc.), exhibit impressive bio-efficacy. After a period of time, alternative antimicrobial compounds (e.g. triclosan, microchek, OBPA, Zn-omadine) initially suffer from decomposition under the high processing temperatures, followed by depletion of the biocide through leaching into the surrounding environment and finally through depleted bactericidal activity. However, silver-containing ion exchange, glass, and/or zeolite compounds do not suffer from these shortcomings. Such antimicrobial agents exhibit high temperature stability (>1000° C.), do not leach into the environment and provide substantial amounts of the oligodynamic silver ion to provide for the desired extensive durability.

The inventive antimicrobial articles should exhibit an acceptable log kill rate after 24 hours in accordance with the AATCC Draft Test Method entitled "Assessment of Antimicrobial Properties on hydrophobic Textiles and Solid Substrates" as well as in accordance with Japanese Test Method JIS 2 2801. Such an acceptable level log kill rate is tested for *Staphylococcus aureus* or *Klebsiella pneumoniae* of at least 0.1 increase over baseline. Alternatively, an acceptable level will exist if the log kill rate is greater than the log kill rate for non-treated (i.e., no solid inorganic antimicrobial added) rubber articles (such as about 0.5 log kill rate increase over control, antimicrobial-free vulcanized EPDM rubber). Preferably these log kill rate baseline increases are at least 0.3 and 0.3, respectively for *S. aureus* and *K. pneumoniae*; more preferably these log kill rates are 0.5 and 0.5, respectively; and most preferably these are 1.0 and 1.0, respectively. Of course, the high end of such log kill rates are much higher than the baseline, on the magnitude of 5.0 (99.999% kill rate). Any rate in between is thus, of course, acceptable as well. However, log kill rates which are negative in number are also acceptable for this invention as long as such measurements are better than that recorded for correlated non-treated rubber articles. In such an instance, the antimicrobial material present within the rubber article at least exhibits a hindrance to microbe growth. Furthermore, such rubber articles should exhibit log kill rates of the same degree for other types of bacteria, such as, *Psedumonas aeruginosa* and *Eschericia coli*.

Such antimicrobial activity is noticed only in relation to a sufficient amount of surface available silver ions on the target rubber article. A high number per surface area (such as above about 0.075 ppb/cm$^2$) is thus required for acceptable antimicrobial efficacy. Such a measurement is basically taken through the immersion of individual samples of colored rubber articles within 15 mL buffer solutions at elevated temperatures for an hour. This extraction test is described in greater detail below with a sodium-potassium phosphate salt solution.

Of great surprise within this invention is the ability for the finished inventive articles to provide antifungal benefits as well as antibacterial characteristics. Such versatility is rare among antibacterial compounds; however, without intending to be limited to any particular scientific theory, it appears that the silver ions, and particularly the silver ions present at the article surface in great abundance, provide excellent antifungal properties. In order to provide a greater array of potential antifungal benefits, other compounds may be incorporated within the target pre-vulcanized rubber formulation (and subsequent article), such as the aforementioned potential filler component zinc oxide, as one example.

Of great importance to the effectiveness of the inventive articles in terms of antimicrobial and antifungal activity is the omission of deleterious amounts of sulfur-based curing agents and accelerators from the rubber article. As noted above, it is believed, without intending to be bound to any specific scientific theory, that sulfur reacts with the preferred silver-based antimicrobials and irreversibly binds the silver ions (as silver sulfides, for example) within the rubber composition and/or article itself. As such, the resultant silver sulfides, etc., are ineffective as antimicrobial agents and their presence thus renders the final product antimicrobially inactive. Thus, it has been necessary to produce a vulcanized rubber article lacking any appreciable amount of sulfur curing agents and accelerators therein. It should be appreciated that the term "appreciable amount" permits a small amount to be present. It has been found that, as a molar ratio, a 1:1 ratio (and above) between sulfur molar presence and silver molar presence results in a clear loss of antimicrobial activity within the desired ultimate vulcanized article. However, greater molar amounts of silver in relation to sulfur provide at least some antimicrobial properties to the desired article. A molar ratio range of from 0.25:1 to about 0.000000001:1 of sulfur to silver ions is thus at least acceptable. The primary curing agent, however, must be of non-sulfur nature (and is preferably, though not necessarily) a peroxide-based compound in order to provide the desired antimicrobial activity for the subject rubber. Although peroxide curing agents have been utilized for vulcanization of rubber previously, such a different type of curing agent is not widely utilized as a suitable vulcanization catalyst for rubber for a number of reasons. Foremost, such curing agents are much more costly than standard sulfur-based agents and thus the utilization of such peroxides, and the like, as a replacement for the sulfur-based compounds have been rather limited to mostly silicone-based rubbers or, at the very least, non-antibacterial rubber articles. However, due to the problems associated with antimicrobial activity when such compounds are reacted with sulfur-based curing agents, alternatives to such sulfur-based cured articles was to permit utilization of such effective antimicrobial compounds within raw and vulcanized rubber for long-term high log kill rate effects. Thus, although non-sulfur-based compounds are not readily utilized within the non-silicone industry as vulcanization curing agents, utilization of such curing agents was necessary to provide an effective, ultimate antimicrobial vulcanized rubber article.

Surprisingly, it has now been found that the inventive rubber articles listed above are available without such sulfur-based curing agents in any appreciable amounts; most importantly, with the introduction of certain additives, the structural integrity and/or flexural modulus of the rubber formulation is improved to an acceptable level and the efficacy of the antimicrobial components are can be controlled simultaneously.

Thus, the curing agent present within the raw rubber formulation to be vulcanized to form the inventive article must be at least a majority, and preferably at least about 75% by weight of a non-sulfur-based curing agent. As discussed above, traditional sulfur and sulfur-based catalysts will not work with the inventive antimicrobial formulations due to chemical reactions between the sulfur atoms and and the biocidal Ag+ ion. However, non-sulfur-based catalysts, such as, for example, and without intending to being limited to peroxides, certain compounds provide effective curing for the inventive raw rubber formulations, such as organic peroxides, including dicumyl peroxide, 2,5-bis(t-butylperoxy)-2,5-dimethylhexane, di-(t-butyl-peroxy-isopropyl) benzene, di-(t-butyl-peroxy-trimethyl)-cyclohexane, and the like, and inorganic peroxides and oxides, including zinc oxide, and the like. Such a curing agent should be present in amount of from about 0.5 to about 100 parts per hundred parts of rubber (pphr); more preferably from about 1 to about 50 pphr; and most preferably from about 2 to about 10 pphr, all either as one curing agent alone, or as the combination of any number of different types.

Other additives present within the inventive vulcanized rubber article include any of the aforementioned silver ion release control additives, accelerators, accelerator activators, antidegradants, softeners, abrasives, colorants, flame retardants, homogenizing agents, internal lubricants, and deodorants. Such components should be present, if at all, in rather low amounts, of from about 0.1 to about 10 pphr.

It has further been unexpectedly determined that a substantial increase in the antibacterial and antifungal efficacy is provided upon washing the finished inventive article. Abrading the surface of such an article also permits increases in such characteristics due to an increase in Ag+ release; however, industrial laundering of certain rubber products (mats, and the like) can be improved in antimicrobial, etc., efficacy through a simple washing. In fact, such an increase steadily improves with greater numbers of consistent washes such that it has been found that a rubber article as first vulcanized exhibits lower overall antibacterial and antifungal activity than one that has been washed one, two, three, and up to at least 20 times (in a standard industrial rotary washing machine). Such a surprising benefit thus permits utilization of such rubber articles as floor coverings (mats, as one example, such as those with carpeted portions or those which are rubber alone; particularly foamed rubber mats for antifatigue properties and reduced specific gravity so as to reduce the chances of machinery damage during such industrial rotary launderings and dryings), and other articles which can be easily washed within standard laundry machines.

Furthermore, as alluded to above, friction with the subject rubber article surface can remove very slight layers of rubber from the article surface thereby permitting "fresh" silver-comprising crystallites to the surface to act as desired in their antibacterial and/or antifungal capacities. Basically, then, the inventive article produced from the inventive raw rubber formulation exhibits an even dispersion of antimicrobial particles throughout the entire rubber article. Such an even dispersion of the biocide throughout the rubber article thus provides a reservoir of fresh crystallites containing the biocidal metallic ion. As layers of the rubber are worn and abraded away, antimicrobial particles containing untapped silver ions become available.

The preferred peroxide-cured colored EPDM and/or NBR rubber-containing articles of this invention containing the antimicrobial agent can be processed into rubber articles which exhibit excellent antimicrobial qualities as well as antimicrobial efficiency throughout the rubber article's lifetime. Examples of other such colored rubber articles encompassed within this invention include, but are not limited to hard rubber mats, sponge or foam rubber mats, static dissipative rubber mats, anti-fatigue rubber mats, rubber mats which include a face fiber, rubber link mats, rubber gaskets, rubber medical goods, rubber gloves, rubber medical devices, rubber conveyor belts, rubber belts and rubber wheels used in food processing, rubber clothing, rubber shoes, rubber boots, rubber tubing, rubber seals, rubber plungers, rubber vehicle bumpers, rubber shoe soles, rubber components for containers, and rubber automotive fuel hoses. Such inventive formulations may also be incorporated into a multilayered rubber article in which the antimicrobial agent can be incorporated into any surface layer and still provide the desired antimicrobial efficiency.

Of particular interest is the formation of multilayered rubber articles wherein at least one of such rubber layer exhibits the desired antimicrobial activity and thus is made from an inventive EPDM rubber-containing article. Such layered articles may be adhered together through co-vulcanization, gluing, and the like. Furthermore, layers of other types of materials may be placed being rubber layers as well to provide, as one non-limiting property, better structural stability to the desired multilayered article. Furthermore, such articles may have at least antimicrobial layer colored and at least one antimicrobial layer uncolored (black or white); or at least one antimicrobial layer colored and at least one uncolored layer (non-antimicrobial); or at least one colored antimicrobial layer, and any others either antimicrobial or not. Basically, any arrangement of such multilayered articles will suffice for this invention as long as at least one layer is an inventive colored antimicrobial rubber formulation as defined herein. Of course, such an inventive rubber formulation may also be a layer (or layers) or component (such as a seal) within any other type of article (such as a metal article, or between two metal articles, a plastic article, or between two or more plastic articles, and the like).

The non-limiting preferred embodiments of these rubber formulations and articles are discussed in greater detail below.

DESCRIPTION OF THE PREFERRED EMBODIMENTS

Inventive Raw Rubber Formulations

Initially, raw rubber formulations without coloring agents were produced and vulcanized to analyze the effects of the silver-containing antimicrobial (in this situation a silver ion-exchange zirconium phosphate salts available from Milliken & Company under the tradename ALPHASAN® conforming to the general formula of comprising about 10.0% by weight of silver ion concentration within the ion-exchange compound of $Ag_xNa_yH_zZr_2(PO_4)_3$, where $x+y+z=1$. The formulations and color determinations are as follows:

(Inventive) EPDM Base Formulation 1

| Component | Amount |
|---|---|
| Ethylene-propylene diene modified Rubber (Nordel IP from DuPont-Dow) | 100 parts |
| Pentaerythritol tetrastearate (processing aid) | 2 pphr |
| Zinc Oxide | 50 pphr |
| Stearic acid | 0.5 pphr |
| Paraffinic oil | 50 pphr |
| Ethyleneglycol dimethacrylate | 2.5 pphr |
| di-(tert-butyl-peroxy-isopropyl)benzene | 4 pphr |
| di-(tert-butyl-peroxy-trimethyl)-cyclohexane | 4 pphr |
| Antimicrobial | 1.5% by weight |

(Inventive) EPDM Base Formulation 2

| Component | Amount |
|---|---|
| Ethylene-propylene diene modified Rubber (Nordel IP from DuPont-Dow) | 100 parts |
| Pentaerythritol tetrastearate (processing aid) | 2 pphr |
| Calcium carbonate | 50 pphr |
| Stearic acid | 0.5 pphr |
| Paraffinic oil | 50 pphr |
| Ethyleneglycol dimethacrylate | 2.5 pphr |
| di-(tert-butyl-peroxy-isopropyl)benzene | 4 pphr |
| di-(tert-butyl-peroxy-trimethyl)-cyclohexane | 4 pphr |
| Antimicrobial | 1.5% |

(Inventive) EPDM Base Formulation 3

| Component | Amount |
|---|---|
| Ethylene-propylene diene modified Rubber (Nordel IP from DuPont-Dow) | 100 parts |
| Pentaerythritol tetrastearate (processing aid) | 2 pphr |
| Calcined Clay | 50 pphr |
| Stearic acid | 0.5 pphr |
| Paraffinic oil | 50 pphr |
| Ethyleneglycol dimethacrylate | 2.5 pphr |
| di-(tert-butyl-peroxy-isopropyl)benzene | 4 pphr |
| di-(tert-butyl-peroxy-trimethyl)-cyclohexane | 4 pphr |
| Antimicrobial | 1.5% |

(Inventive) EPDM Base Formulation 4

| Component | Amount |
|---|---|
| Ethylene-propylene diene modified Rubber (Nordel IP from DuPont-Dow) | 100 parts |
| Pentaerythritol tetrastearate (processing aid) | 2 pphr |
| China Clay | 50 pphr |
| Stearic acid | 0.5 pphr |
| Paraffinic oil | 50 pphr |
| Ethyleneglycol dimethacrylate | 2.5 pphr |
| di-(tert-butyl-peroxy-isopropyl)benzene | 4 pphr |
| di-(tert-butyl-peroxy-trimethyl)-cyclohexane | 4 pphr |
| Antimicrobial | 1.5% |

(Inventive) EPDM Base Formulation 5

| Component | Amount |
|---|---|
| Ethylene-propylene diene modified Rubber (Nordel IP from DuPont-Dow) | 100 parts |
| Pentaerythritol tetrastearate (processing aid) | 2 pphr |
| Magnesium Silicate | 50 pphr |
| Stearic acid | 0.5 pphr |
| Paraffinic oil | 50 pphr |
| Ethyleneglycol dimethacrylate | 2.5 pphr |
| di-(tert-butyl-peroxy-isopropyl)benzene | 4 pphr |
| di-(tert-butyl-peroxy-trimethyl)-cyclohexane | 4 pphr |
| Antimicrobial | 1.5% |

(Inventive) EPDM Base Formulation 6

| Component | Amount |
|---|---|
| Ethylene-propylene diene modified Rubber (Nordel IP from DuPont-Dow) | 100 parts |
| Pentaerythritol tetrastearate (processing aid) | 2 pphr |
| Silica/Silane Oil Combination (Aktisil ® MAM, from Hoffman Minerals) | 50 pphr |
| Stearic acid | 0.5 pphr |
| Paraffinic oil | 50 pphr |
| Ethyleneglycol dimethacrylate | 2.5 pphr |
| di-(tert-butyl-peroxy-isopropyl)benzene | 4 pphr |
| di-(tert-butyl-peroxy-trimethyl)-cyclohexane | 4 pphr |
| Antimicrobial | 1.5% |

(Inventive) EPDM Base Formulation 7

| Component | Amount |
|---|---|
| Ethylene-propylene diene modified Rubber (Nordel IP from DuPont-Dow) | 100 parts |
| Pentaerythritol tetrastearate (processing aid) | 2 pphr |
| Aluminum trihydrate | 50 pphr |
| Stearic acid | 0.5 pphr |
| Paraffinic oil | 50 pphr |
| Ethyleneglycol dimethacrylate | 2.5 pphr |
| di-(tert-butyl-peroxy-isopropyl)benzene | 4 pphr |
| di-(tert-butyl-peroxy-trimethyl)-cyclohexane | 4 pphr |
| Antimicrobial | 1.5% |

(Inventive) NBR Base Formulation 8

| Component | Amount |
|---|---|
| Acrylonitrile butadiene Rubber (from Zeon Chemicals) | 100 parts |
| Stearic acid | 1 pphr |
| Microcrystalline wax | 2 pphr |
| Polyethylene glycol | 5 pphr |
| Zinc oxide | 5 pphr |

-continued

| Component | Amount |
|---|---|
| Calcium carbonate | 20 pphr |
| di-octyl-phthalate | 3 pphr |
| di-(tert-butyl-peroxy-isopropyl)benzene | 4 pphr |
| di-(tert-butyl-peroxy-trimethyl)-cyclohexane | 4 pphr |
| Antimicrobial | 1.5% |

(Comparative) EPDM Base Formulation 1

| Component | Amount |
|---|---|
| Ethylene-propylene diene modified Rubber (Nordel IP from DuPont-Dow) | 100 parts |
| Pentaerythritol tetrastearate (processing aid) | 2 pphr |
| Silica | 50 pphr |
| Stearic acid | 0.5 pphr |
| Paraffinic oil | 50 pphr |
| Ethyleneglycol dimethacrylate | 2.5 pphr |
| di-(tert-butyl-peroxy-isopropyl)benzene | 4 pphr |
| di-(tert-butyl-peroxy-trimethyl)-cyclohexane | 4 pphr |
| Antimicrobial | 1.5% |

(Comparative) EPDM Base Formulation 2

| Component | Amount |
|---|---|
| Ethylene-propylene diene modified Rubber (Nordel IP from DuPont-Dow) | 100 parts |
| Pentaerythritol tetrastearate (processing aid) | 2 pphr |
| Aluminum silicate | 50 pphr |
| Stearic acid | 0.5 pphr |
| Paraffinic oil | 50 pphr |
| Ethyleneglycol dimethacrylate | 2.5 pphr |
| di-(tert-butyl-peroxy-isopropyl)benzene | 4 pphr |
| di-(tert-butyl-peroxy-trimethyl)-cyclohexane | 4 pphr |
| Antimicrobial | 1.5% |

(Comparative) EPDM Base Formulation 3

| Component | Amount |
|---|---|
| Ethylene-propylene diene modified Rubber (Nordel IP from DuPont-Dow) | 100 parts |
| Pentaerythritol tetrastearate (processing aid) | 2 pphr |
| Stearic acid | 0.5 pphr |
| Paraffinic oil | 50 pphr |
| Ethyleneglycol dimethacrylate | 2.5 pphr |
| di-(tert-butyl-peroxy-isopropyl)benzene | 4 pphr |
| di-(tert-butyl-peroxy-trimethyl)-cyclohexane | 4 pphr |
| Antimicrobial | 1.5% |

(Comparative) NBR Base Formulation 4

| Component | Amount |
|---|---|
| Acrylonitrile butadiene Rubber (from Zeon Chemicals) | 100 parts |
| Stearic acid | 1 pphr |
| Microcrystalline wax | 2 pphr |
| Polyethylene glycol | 5 pphr |

-continued

| Component | Amount |
|---|---|
| Silica | 40 pphr |
| Zinc oxide | 5 pphr |
| Calcium carbonate | 20 pphr |
| di-octyl-phthalate | 3 pphr |
| di-(tert-butyl-peroxy-isopropyl)benzene | 4 pphr |
| di-(tert-butyl-peroxy-trimethyl)-cyclohexane | 4 pphr |
| Antimicrobial | 1.5% |

The compounding of ingredients within each formulation can be carried out in an open mill, an internal mixer, or an extruder where intensive mixing within the polymer matrix of each component will take place. During the mixing operation, the control of temperature rise, due to high shear incorporation of the ingredients, is crucial to ensure that pre-vulcanization (scorch) does not take place during processing. Generally, a maximum temperature of 120° C. is reached on single stage (pass) mixing through an internal mixer. The compounds can be further processed after mixing into specific forms to allow adequate presentation for manufacturing into products. This could be calendering, extrusion, granulation/pelletization, strip form, fabrication and preforming into specific shaped blanks of 3 inches×2 inches in size through compression molding for 10 minutes at 180° C. and subsequent cooling to room temperature.

The vulcanization of the compounds can be in the form of molding (compression, transfer, injection), continuous extrusion (LCM, UHF[where permissible], autoclave and hot air), and coatings. The vulcanization (cure) temperatures can range from 150° C. to 250° C. In this specific situation, the rubber articles were calendared into rough mat structures and then subjected to vulcanization under high temperature and pressure.

Rubber itself does not exhibit dark colorations unless specific pigments (e.g., carbon black, for example) are added, or unless other sources of colorations (dark or otherwise) are present. The finished vulcanized structures thus should not exhibit any appreciable colorations except for discolorations present due to filler-silver ion complexation. Low discolorations are thus acceptable for the inclusion of other color sources to impart desired colorations to vulcanized rubber formulations further comprising a coloring agent during vulcanization. High discolorations within such uncolored base vulcanized formulations will not permit such coloring due to dominance of the dark discolorations produced through the unwanted silver ion-filler complexation (or like reaction). Thus, the above uncolored vulcanized samples were analyzed empirically for acceptable low discoloration levels. In the table below, a +++ indicates extremely low colorations, a ++ indicates very low discolorations, a + indicates at least acceptable low discolorations (all for coloring of intended finished vulcanized rubber articles), and a − or −− indicates unacceptable high discolorations. The results were as follows:

DISCOLORATION RESULTS TABLE

| Base EPDM Formulation | Appearance |
|---|---|
| (Inventive) 1 | + + + |
| (Inventive) 2 | + + |
| (Inventive) 3 | + + |

-continued

DISCOLORATION RESULTS TABLE

| Base EPDM Formulation | Appearance |
|---|---|
| (Inventive) 4 | + + |
| (Inventive) 5 | + + |
| (Inventive) 6 | + + |
| (Inventive) 7 | + |
| (Inventive) 8 | + + |
| (Comparative) 1 | - - |
| (Comparative) 2 | - - |
| (Comparative) 3 | + + + |
| (Comparative) 4 | - - |

Of course, the third comparative example was the control rubber without any filler component. Although it exhibited excellent low discoloration, the lack of a proper filler resulted in low dimensional stability for the overall product, and thus it was unacceptable for further use.

Thus, selected formulations of the acceptable low discoloration base rubbers were then prepared with certain colorants added thereto to provide the desired coloring effects. Thus, 5 php of titanium dioxide (for white), 5 php of a phthalocyanine blue (RD Blue B609 from Prima Colour), 5 php of a di-arylide yellow (RD Yellow B581 from Prisma Colour), and 5 php of a phthalocyanine green (RD Green B592 from Prisma Colour), were all individually mixed within inventive EPDM base formulation 2, above, to produce the desired antimicrobial colored EPDM rubber articles (calendared sheets).

Analyses for Surface-Available Silver

Each such colored article (small samples of 2 inch by 3 inch dimensions) was then exposed to an extract solution at room temperature for 24 hours (or more, as listed below). In each instance below, the extract solution used was a sodium-potassium phosphate buffer solution, although any salt solution (e.g., sodium chloride, calcium chloride, and the like) could also be utilized as the test extract solution as long as proper silver extraction is permitted with such solutions. Controls with silver antimicrobial but no carboxylic acid salt were tested as comparisons.

The extraction procedure and analyses involved first producing a standard plot of different silver concentrations within a nitric acid solution. The silver preparations were prepared by first weighing out 1000 ppm of silver into 100 mL volumetric flask and adding a sufficient amount of a 5% nitric acid solution to the flask to the fill line (to produce a 1 ppm silver standard). A further dilution of 10 g of the 1 ppm preparation into a 100 mL volumetric flask and then adding the remainder of 5% nitric acid solution (to produce a 100 ppb standard. A final 500 ppb standard was then prepared in similar fashion with 5 g of the 100 ppb standard used. The concentrations were then measured by utilization of inductively coupled plasma spectroscopy for such silver content. The results were then plotted for comparison with the eventual silver content of the extract solutions below.

The extract solution a 1X strength solution of a sodium-potassium-phosphate solution (initially about 145 g of sodium phosphate mixed with about 71 g of potassium phosphate diluted in a 1 liter volumetric flask with deionized water, with a subsequent dilution of 100 mL of this first solution to 1000 mL with deionized water). The treated plaques were then individually placed within a sealed plastic bag with a sufficient amount of the extract solution to fully immerse the sample. The bag was then placed and placed on an orbital shaker at 140 rpm and kept at room temperature for 24 hours. After that time, 9.5 mL of the resultant extract solution was then placed into a 15 mL vial with 0.5% of 70% nitric acid added. The resultant test extract solution was then subjected to ICP spectroscopy and the resulting measurements of silver concentration were then plotted against the standards, above. The measurements for the above plaque samples are as follows:

EXPERIMENTAL SILVER EXTRACTION TABLE

| Example # | Amount of Silver Detected ($\mu g/dm^2$) |
|---|---|
| White | 0.344 |
| Blue | 0.106 |
| Yellow | 0.094 |
| Green | 0.142 |

Thus, since a target of 0.075 $\mu g/dm^2$ is necessary to theoretically impart the desired antimicrobial activity to the target rubber article, these examples clearly provided sufficient surface available silver while still retaining effective and pleasing colorations therein.

Having described the invention in detail it is obvious that one skilled in the art will be able to make variations and modifications thereto without departing from the scope of the present invention. Accordingly, the scope of the present invention should be determined only by the claims appended hereto.

What is claimed is:

1. A dimensionally stable colored vulcanized rubber article comprising a majority of at least one non-silicone rubber constituent, and further comprising at least one silver-based antimicrobial agent, and at least one non-discoloring silver-ion control release additive selected from the group consisting of fillers, oils, and mixtures thereof, wherein no black coloring agents are present therein, and wherein said colored rubber article exhibits a minimum of 0.075 $\mu g/dm^2$ of surface available silver.

2. The rubber article of claim 1 wherein said silver-based antimicrobial compound is selected from the group consisting of elemental silver, silver oxides, silver salts, silver ion exchange compounds, silver zeolites, silver glasses, and any mixtures thereof.

3. A dimensionally stable colored vulcanized rubber article comprising a majority of at least one non-silicone rubber constituent, and further comprising an effective surface availability of silver ions of at least one silver-based antimicrobial agent, and at least one non-discoloring silver-ion control release additive selected from the group consisting of fillers, oils, and mixtures thereof, wherein no black coloring agents are present therein.

4. The rubber article of claim 3 wherein said silver-based antimicrobial compound is selected from the group consisting of elemental silver, silver oxides, silver salts, silver ion exchange compounds, silver zeolites, silver glasses, and any mixtures thereof.

5. The rubber article of claim 3 wherein said at least one silver ion control release additive is a hydrophilic filler selected from the group consisting of metal silicates, metal stearates, metal oxides, metal carbonates, clays, silica treated with silane oil, and any mixtures thereof.

6. The rubber article of claim 1 wherein said at east one silver ion control release additive is a hydrophilic filler selected from the group consisting of metal silicates, metal stearates, metal oxides, metal carbonates, clays, silica treated with silane oil, and any mixtures thereof.

7. The rubber article of claim 3 wherein said rubber constituent is selected from the group consisting of EPDM, NBR, and any mixtures thereof.

8. A method of producing a colored rubber article exhibiting a minimum surface availability of silver ions of 0.075 µg/dm², comprising the steps of
  a) compounding together an unvulcanized rubber formulation comprising at least one rubber constituent, the majority of which must be a non-silicone rubber, at least one silver-based antimicrobial compound, at least coloring agent, at least one filler component, and at least one curing compound, wherein no black coloring agents are present, and wherein said curing compound present within said formulation does not include an appreciable amount of sulfur-based compounds,
  b) molding said rubber formulation into a preselected shape, and
  c) vulcanizing said rubber formulation under high pressure and exposure to high temperature.

9. The rubber article of claim 1 wherein said rubber constituent is selected from the group consisting of EPDM, NBR, and any mixtures thereof.

10. The method of claim 8 wherein said rubber constituent is selected from the group consisting of EPDM, NBR, and any mixtures thereof.

11. The method of claim 8 wherein said silver-based antimicrobial compound is selected from the group consisting of elemental silver, silver oxides, silver salts, silver ion exchange compounds, silver zeolites, silver glasses, and any mixtures thereof.

12. The method of claim 11 wherein said at least one filler component simultaneously functions as a silver ion control release additive.

13. The method of claim 12 wherein said at least one filler/silver ion control release additive is selected from the group consisting of fillers, oils, and mixtures thereof.

14. The method of claim 13 wherein said at least one filler/silver ion control release additive is a hydrophilic filler selected from the group consisting of metal silicates, metal stearates, metal oxides, metal carbonates, clays, silica treated with silane oil, and any mixtures thereof.

* * * * *

UNITED STATES PATENT AND TRADEMARK OFFICE
CERTIFICATE OF CORRECTION

PATENT NO. : 6,638,993 B2
DATED : October 28, 2003
INVENTOR(S) : Bhawan Patel et al.

It is certified that error appears in the above-identified patent and that said Letters Patent is hereby corrected as shown below:

Column 16,
Line 60, delete the word "east" and insert the word -- least --.

Column 17,
Line 7, after the word "least" insert the word -- one -- before the word "coloring."

Signed and Sealed this

Fourth Day of January, 2005

JON W. DUDAS
*Director of the United States Patent and Trademark Office*